US009019083B2

(12) United States Patent
Corsini et al.

(10) Patent No.: US 9,019,083 B2
(45) Date of Patent: Apr. 28, 2015

(54) PROGRAMMABLE MULTIMEDIA CONTROL SYSTEM HAVING A TACTILE REMOTE CONTROL

(75) Inventors: Peter H. Corsini, East Sandwich, MA (US); Timothy R. Locascio, Osterville, MA (US); Michael E. Noonan, Sandwich, MA (US); Michael C. Silva, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 569 days.

(21) Appl. No.: 13/238,177

(22) Filed: Sep. 21, 2011

(65) Prior Publication Data

US 2012/0081215 A1 Apr. 5, 2012

Related U.S. Application Data (60) Provisional application No. 61/385,379, filed on Sep. 22, 2010.

(51) Int. Cl.
*G05B 11/01* (2006.01)
*G08C 19/16* (2006.01)
*H04N 21/41* (2011.01)
*G06F 1/16* (2006.01)
*H04N 21/422* (2011.01)
*H04N 21/436* (2011.01)

(52) U.S. Cl.
CPC .......... *H04N 21/4126* (2013.01); *G06F 1/1632* (2013.01); *H04N 21/42204* (2013.01); *H04N 21/43615* (2013.01)

(58) Field of Classification Search
USPC ...................................................... 340/12.5
See application file for complete search history.

(56) References Cited

U.S. PATENT DOCUMENTS

| 6,437,836 | B1 * | 8/2002 | Huang et al. .................. 348/734 |
| 6,687,487 | B1 * | 2/2004 | Mosebrook et al. ......... 455/11.1 |
| 2002/0194619 | A1 * | 12/2002 | Chang et al. .................. 725/134 |
| 2005/0096753 | A1 * | 5/2005 | Arling et al. .................... 700/11 |
| 2007/0142022 | A1 | 6/2007 | Madonna et al. |

(Continued)

FOREIGN PATENT DOCUMENTS

WO    WO-2010/027492 A2    3/2010

OTHER PUBLICATIONS

"Notification of Transmittal of the International Search Report and the Written Opinion of the International Searching Authority, or the Declaration," International Filing Date: Sep. 22, 2011, International Application No. PCT/US2011/001636, Applicant: Savant Systems, LLC., Date of Mailing: Nov. 28, 2011, pp. 1-9.

*Primary Examiner* — George Bugg
*Assistant Examiner* — Anthony D Afrifa-Kyei
(74) *Attorney, Agent, or Firm* — Cesari and McKenna, LLP (57) ABSTRACT

In one embodiment, a remote control device is configured to receive a portable control device into a recess, such that the portable control device is mechanically and electrically coupled to the remote control device. The portable control device communicates with a programmable multimedia controller, by way of a bi-directional wireless communication path, and with a dedicated wireless receiver, providing a redundant communication path. The remote control device includes surface enhanced buttons that allow a user to make selections by the sense of touch for changing settings of components associated with the programmable multimedia controller.

11 Claims, 7 Drawing Sheets (56) References Cited

U.S. PATENT DOCUMENTS

| | | |
|---|---|---|
| 2007/0143801 A1 | 6/2007 | Madonna et al. |
| 2007/0169115 A1 | 7/2007 | Ko et al. |
| 2007/0230910 A1 | 10/2007 | Welch et al. |
| 2007/0260697 A1 | 11/2007 | Shapiro |
| 2008/0079604 A1 | 4/2008 | Madonna et al. |
| 2008/0158148 A1 | 7/2008 | Madonna et al. |
| 2008/0228934 A1 | 9/2008 | Eschholz et al. |
| 2008/0297480 A1* | 12/2008 | Lee .................... 345/169 |
| 2009/0129340 A1* | 5/2009 | Handa ................. 370/331 |
| 2010/0049835 A1 | 2/2010 | Ko et al. |
| 2010/0079106 A1 | 4/2010 | Graham |
| 2010/0113106 A1 | 5/2010 | Supran |
| 2010/0141839 A1 | 6/2010 | Supran et al. |
| 2011/0131358 A1 | 6/2011 | Ganesh et al. |
| 2011/0145466 A1 | 6/2011 | Supran et al. |

* cited by examiner

PROGRAMMABLE MULTIMEDIA CONTROL SYSTEM HAVING A TACTILE REMOTE CONTROL

CROSS-REFERENCE TO RELATED APPLICATIONS

The present application claims the benefit of U.S. Provisional Patent Application Ser. No. 61/385,379, which was filed on Sep. 22, 2010, by Peter H. Corsini et al. for a PROGRAMMABLE MULTIMEDIA CONTROL SYSTEM HAVING A TACTILE REMOTE CONTROL and is hereby incorporated by reference, and the present application is related to U.S. Provisional Patent Application No. 61/351,085, which was filed on Jun. 3, 2010 by Robert P. Madonna et al., for a DOCKING STATION WITH REDUNDANT COMMUNICATION PATH, which is incorporated by reference herein.

BACKGROUND OF THE INVENTION

1. Field of the Invention

This invention relates generally to programmable multimedia control systems, and more particularly, to interfacing a remote control device with the system.

2. Background Information

A programmable multimedia controller (PMC) controls and/or manages a wide variety of audio, video, telecommunications, data communications or other devices with which the PMC is interfaced. As used herein, PMC and "programmable multimedia controller" are used interchangeably. The PMC with programmable services is based on a general purpose computer, which controls a specialized embedded computer system. The general purpose computer may be matched with a second general purpose computer to provide redundancy. The multimedia controller includes a programming environment for creating services or user experiences that may incorporate features or functionalities of several devices that are conventionally operated as separate, standalone devices. Such services may range in complexity from simple control functions to multimedia experiences that combine high performance audio and video with the graphics capability of a general purpose computer, web-based services and telecommunications.

Services may be implemented according to various zones within a larger physical space. For example, a user may specify that certain services are available in the family room of a home, while different services are available in the kitchen, depending upon the components that are available in each room. Services may also be implemented on a per user basis in conjunction with a user profile which specifies preferences, restrictions (e.g., parental controls) and the like.

The programming environment includes a library of component profiles. Component profiles may be implemented in a number of ways based upon desired attributes of the underlying data structures. In a preferred embodiment, a component profile is implemented as an Extensible Markup Language (XML) file which describes certain attributes of a component such as a DVD player, television, amplifier or any other type of component that is capable of interfacing with the system of the present invention. A component profile typically describes at least some of the physical characteristics of the component (e.g., the input/output connectors located on the back of the component), the configuration of the component (e.g., all possible types of modules that may be present in the slots or bays of a modular receiver), the set of commands that the component recognizes (e.g., power on, power off, open disk tray), as well as the functions that the component is capable of performing (e.g., play, pause, stop).

Use of XML files for component profiles, as well as other aspects of the programmable multimedia environment are discussed in commonly owned U.S. patent application Ser. No. 11/314,112 of Madonna, et al. for a PROGRAMMABLE MULTIMEDIA CONTROLLER WITH PROGRAMMABLE SERVICES, filed on Dec. 20, 2005, which is presently incorporated herein by reference.

Various portable communication and control devices come on the market from time to time. Examples of such devices are the Apple® iPad®, iPod® and iPod Touch®. As used herein, the terms "PCD" and PCD are used interchangeably to refer to such devices and comparable devices. These devices provide touch screen functionality for user input selections and are themselves programmable.

Users of such devices would find it to be beneficial to combine the functionality of such PCDs with the PMC to provide control of the components of the programmable multimedia system. Such a combination has been disclosed and described in commonly owned U.S. patent application Ser. No. 61/351,085, of Madonna et al., entitled DOCKING STATION WITH REDUNDANT COMMUNICATION PATH, filed on Jun. 3, 2010, which is presently incorporated herein by reference.

That patent application describes a system whereby a portable control device wirelessly transmits and receives information between it and the programmable control device. Additionally, a redundant communication path is created with a direct hardwired connection. However, in some circumstances, it may be desirable to use a wireless communication device. Thus, there remains a need for a system that allows a portable control device to interface with the PMC.

Another problem to be addressed is that the planar touch screen of the PCD is undesirable to many users when used for making selections with reference to a T.V., DVD and CD control. Many users prefer a remote control device which includes selection buttons that provide tactile feedback to the user, so that the user may make selections based on the feel of the remote control buttons without looking away from the media screen. Thus, there remains a need to address these problems.

SUMMARY OF THE INVENTION

These and other disadvantages are solved by the present invention in which a multimedia control system is interfaced with a PCD using a specialized remote control and a redundant wireless connection between the PCD and the PMC. The PCD is configured with an application that allows it to be compatible with the PMC. This allows a user to make entries selecting various components interfaced with the system. In particular the device is configured with a software program application which is sold commercially as ROSIE®, which software and associated trademark are owned by Savant Systems, LLC of Osterville, Mass. The many supported functions include such things as, for example, raising the volume on a surround sound audio system or setting a temperature on a central air conditioning system, and placing a phone call.

In accordance with an aspect of the invention, a programmable multimedia controller controls a variety of components as described hereinafter. To that end, an associated remote control body portion is of a generally rectangular shape and has a top surface having two sections. The first section has a series of buttons that are surface enhanced. These buttons provide a user with tactile feedback so that the user can disambiguate each button from the other. The user can then selected a function that translates to an action to be performed with respect to the media with which the user is then interacting. Such functions include volume control, channel changing, DVD control, and making or receiving a phone call. The buttons have a raised surface or other tactile construction such that the user may make selections based upon the feel of the buttons without having to look away from the media screen being used at the time. For example, the user may select a channel up and down, volume up and down; employ a guide button, menu button, and the like.

As noted, the top surface of the remote control is shaped to conform to a surface of the PCD. In accordance with one embodiment of the invention, the remote control is equipped with a slot coupling that receives and secures the exterior circumference of the PCD to the remote control, thus mechanically coupling the PCD to the remote control device. The remote control also contains a receive portion for a 30 pin connector that allows the remote control to interface with the PCD so as to electrically couple the remote control and the PCD. Thus, the PCD is both mechanically and electrically coupled to the remote control device.

In accordance with another aspect of the invention, the combined remote control and PCD communicates with the PMC over a redundant wireless communication system. More particularly, the PCD has been configured with software allowing it to communicate wirelessly with the PMC. Additionally, a dedicated local receiver is provided in the system which receives and transmits data from the PCD. Thus, if one of the wireless communication paths becomes unavailable then the other wireless communication path transmits and/or receives the data. These two wireless communication paths provide for redundancy when the portable communication device is used with the system.

The device of the present invention also allows for load sharing between the components, if desired, with respect data transmission.

In accordance with yet a further aspect of the invention, the remote control is programmed to allow for gesture control of the components. For example, the user of the system can wave the remote control back and forth in order to make an entry or a change in the media then being used.

It should be understood that the remote control can also be used as a phone, as the PMC fully supports all aspects of telephony so that, for example, a VoIP call can be made on the remote control. Thus, the control can be used to select items on the TV or other screen and can be used as a telephone when desired. The remote control device is configured to provide for messages suitable for transmission over the wireless network in order to transmit and receive information from the PMC or from the remote directly to a component being operated by the PMC.

BRIEF DESCRIPTION OF THE DRAWINGS

The invention description below refers to the accompanying drawings, of which.

DETAILED DESCRIPTION OF AN ILLUSTRATIVE EMBODIMENT

By interacting with the tactile remote control and the portable control device of the present invention the PMC implements an integrated multimedia control solution with a desirable user experience.

Figure 1:
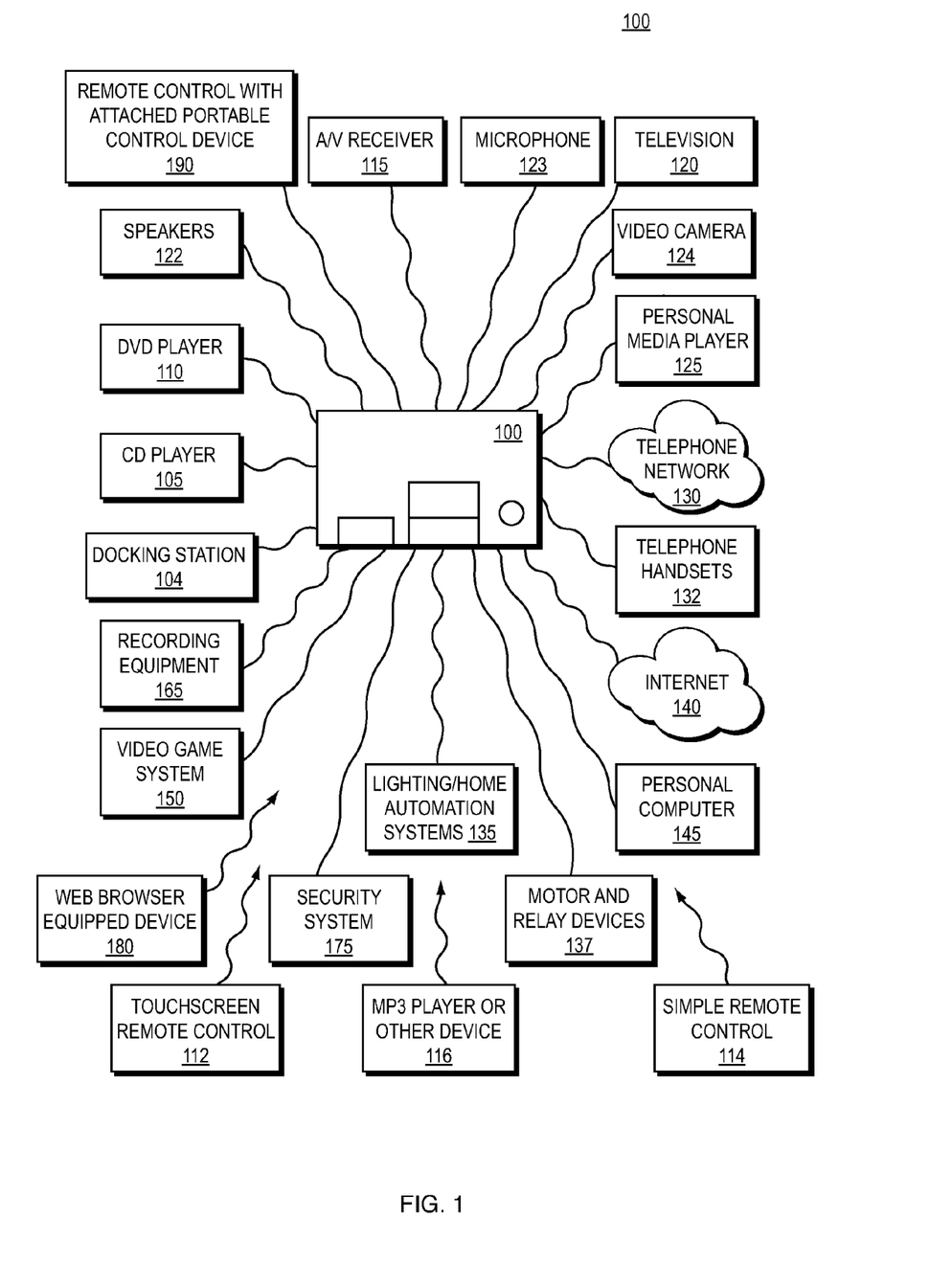
FIG. 1 is a programmable multimedia control system in accordance with an illustrative embodiment of the present invention.

In the illustrative embodiment, the PMC 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The PMC may also be connected to telephony devices such as a telephone network 130 and telephone handsets 132. The telephone network 130 may be a publicly switched telephone network (PSTN), an Integrated Services Digital Network (ISDN) or other communications network.

In addition, the PMC may intercommunicate with variety of light and/or home automation systems 135. These devices may operate via the X10 protocol developed by Pico Electronics, the INSTEON™ protocol developed by Smart Home, Inc, the Cebu's standard managed by the Cebu's Industry Council, or another well known home automation or control protocol. Similarly, the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected. Further, one or more remote control units 170 may be provided to manage the controller's functionality, and/or to control devices connected to the controller.

As discussed more fully hereinafter, a remote control device with an attached PCD 190 is coupled to the PMC 100 as described hereinafter.

Figure 2:
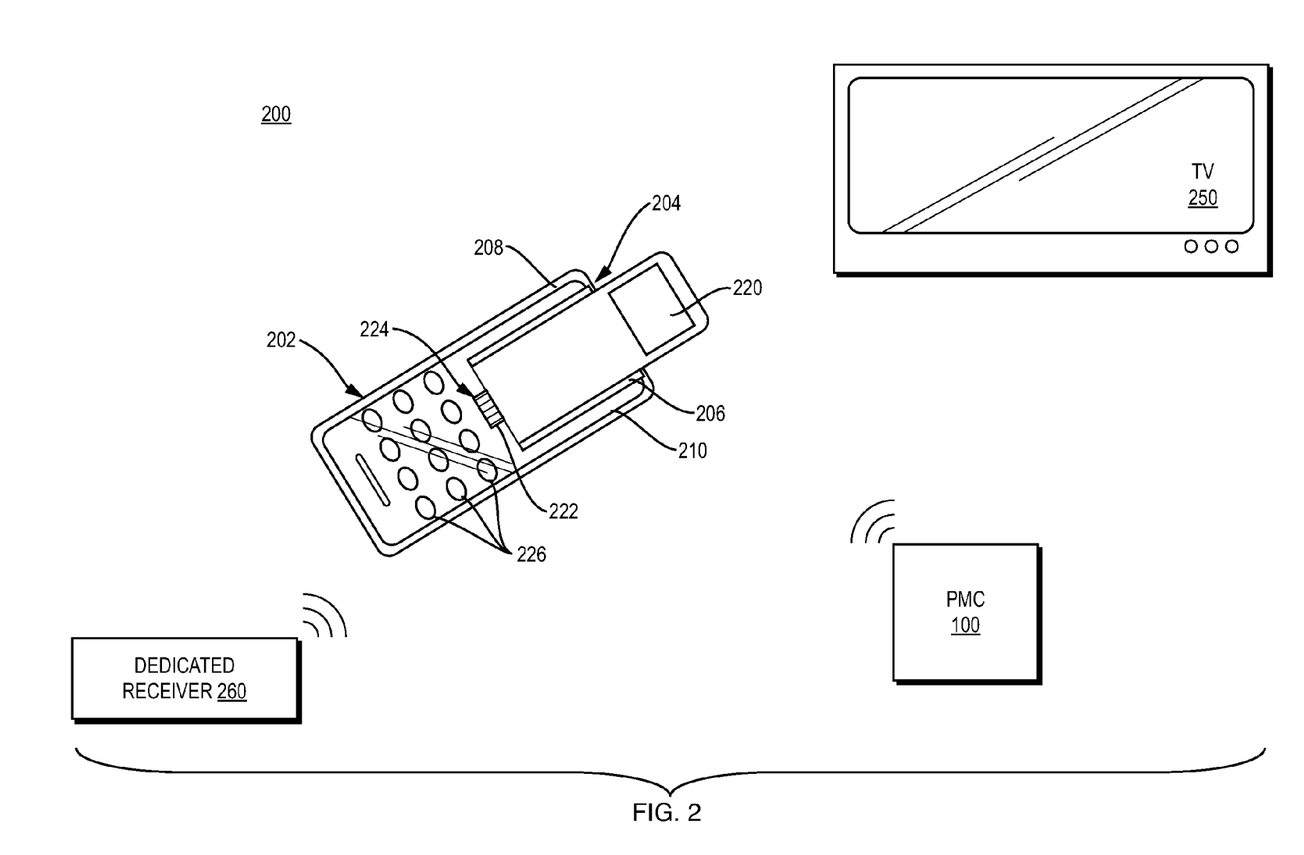
FIG. 2 is a schematic diagram of the tactile remote control coupled with a portable control device and interfacing with the PMC and the dedicated wireless receiver in accordance with an illustrative embodiment of the present invention.

The system for controlling a component which is interfaced with a PMC 100 is illustrated in FIG. 2. The system 200 has a remote control 202, which is contructed in such a manner that so that it has an indented portion 204 consisting of a generally flat base 206 and a bevel 208 and 210 on either side respectively. This forms a recess 204 which receives a PCD 220. The size of the recess is designed to receive the desired PCD. This recess may be customized for one particular kind of device or the recess can have several bevels in it so that devices of varying physical dimensions can be accommodated. The PCD 220 has a 30 pin connector to 222 which is received into a matching connecter 224 on the remote control 202. The remote control 202 is fitted with a number of buttons 226. The buttons are surface-enhanced such that the buttons provide a user with tactile feedback so that the user can disambiguate each button from the other, without looking. Accordingly, the user can make selections with out looking at the remote control.

If a button is pressed on the remote 202 (or on the PCD screen 220) the system first attempts to send the information via WiFi. If the PCD is not running the ROSIE® application or if the WiFi is down, then the command is sent via the dedicated wireless communication receiver 260.

Figure 3:
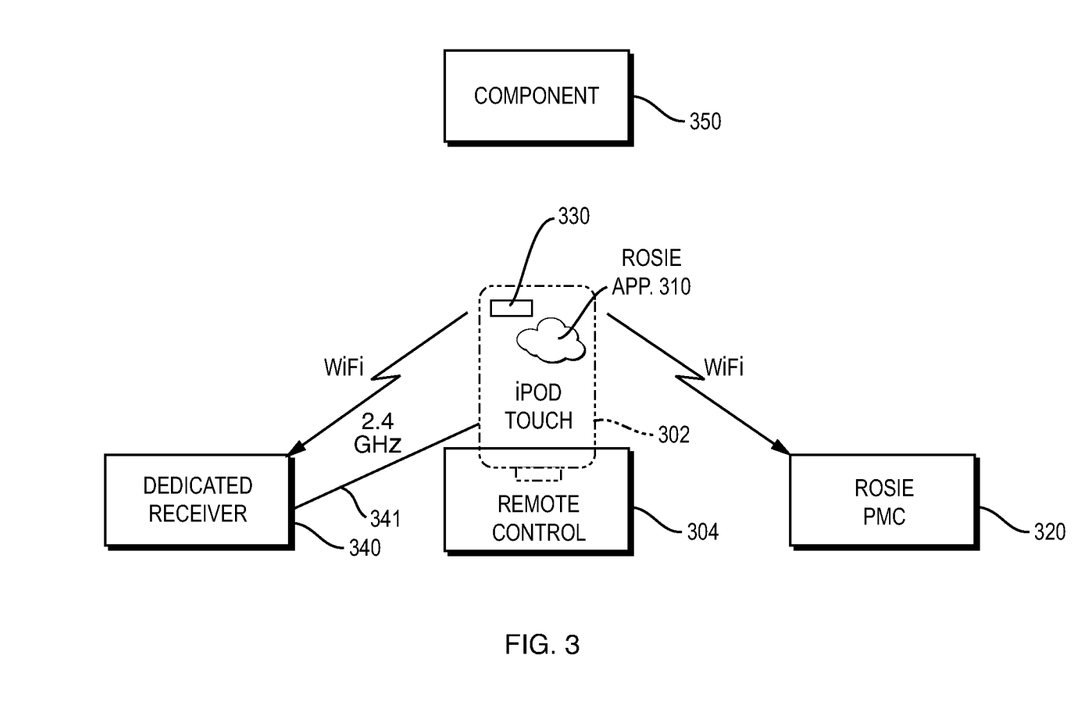
FIG. 3 is a schematic block diagram of the components and connections illustrating the redundant wireless path in accordance with an illustrative embodiment of the invention.

FIG. 3 illustrates the components that are used with respect to the system 300 of the present invention. As discussed herein, a portable communication device, such as the device 302 is coupled to a remote control 304. The portable communication device is configured with a ROSIE™ application 310, which is the software which communicates with the ROSIE™ PMC 320. The PCD 302 performs messaging and other transmissions that are compatible with the ROSIE 320 and the ROSIE in turn is coupled to the components, such as the component 350. The portable communication device 302 has a Wi Fi transmitter and receiver 330. When a signal is sent from the portable communication device using the ROSIE messaging, it is transmitted to the ROSIE PMC, which in turn as shown in FIG. 1, controls, for example, a video game system 150, a DVD player 110 or other media device.

Figure 4A:
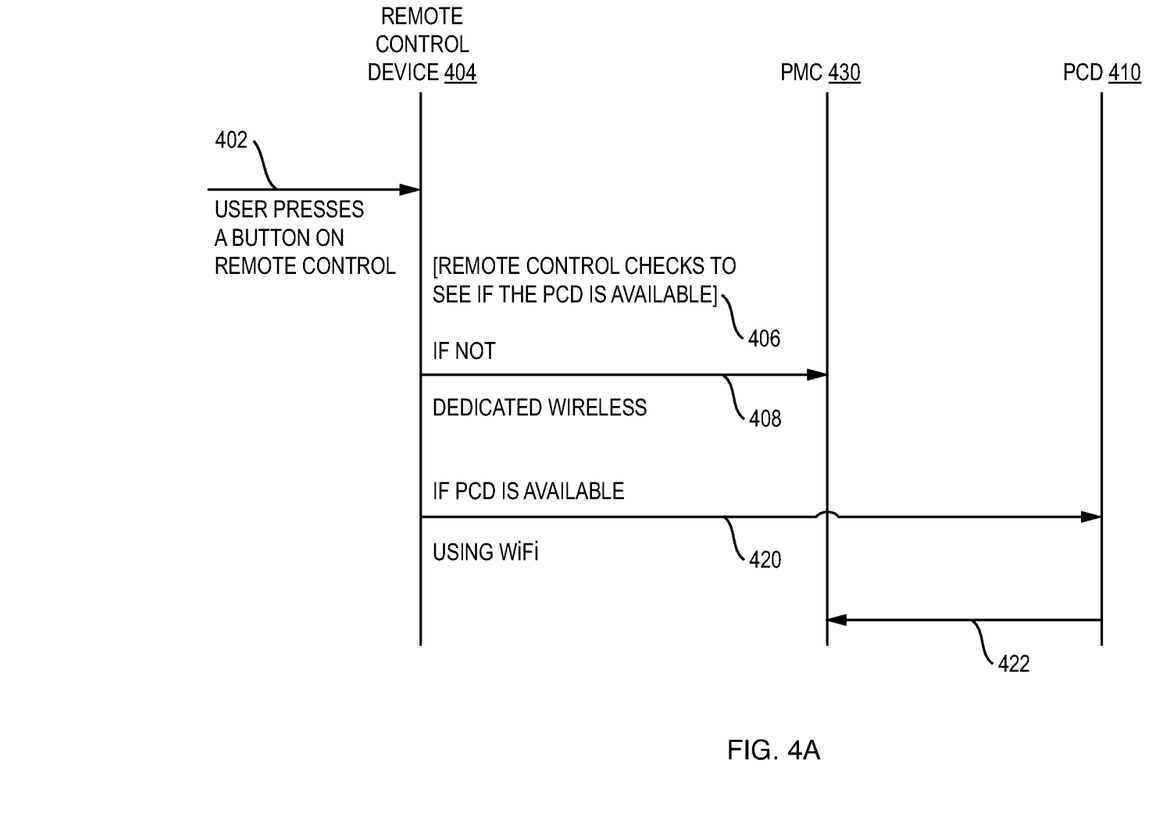
FIG. 4A depicts a message sequence for the communication between the components in accordance with a illustrative embodiment of the present invention.
Figure 4B:
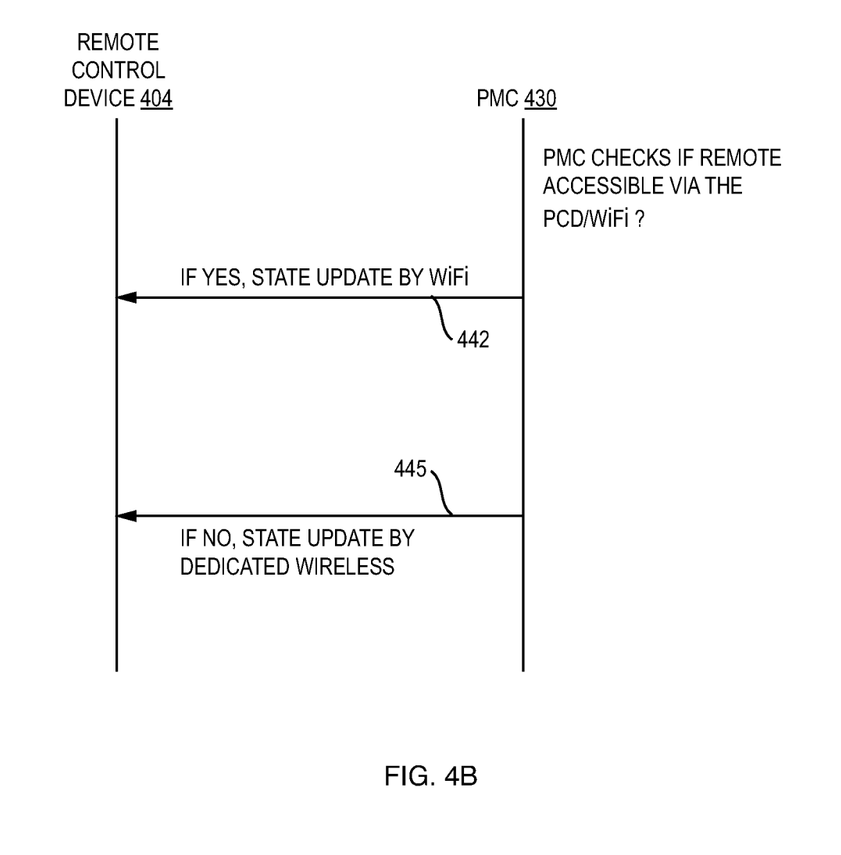
FIG. 4B depecits a message sequence for reporting status and state information by the programmable multimedia controller in accordance with an illustrative embodiment of the invention.

FIGS. 4A and 4B depict the messaging sequence for the operation of the system of the present invention. FIG. 4A illustrates the messaging between the remote control device 404, the PMC 430 and the portable control device 410. When a user desires to make a selection for a feature on one of the components in the system he does so by pressing a button 402 on the remote control device 404. The remote control device 404, in turn, determines whether the portable control device 410 is available for communication as shown as internal step 406. If it is not available, then the remote control device 404 sends the message using the dedicated wireless connection 408. If the portable control device is available (i.e., the ROSIE application is running and Wi-Fi is available), the portable control device 410, then sends a message 422 with a command reflecting the user's selection to the PMC 430, which in turn sends the command to the component involved.

FIG. 4B depicts the message sequence for state and status operations. The PMC 430 checks whether the remote is accessible via the PCD/Wi-Fi. If the remote control is accessible, then the state update is sent over WiFi, as message 442. If the remote control is not accessible, then the state and status information message 445 is sent by the dedicated wireless communication connection.

Figure 5:
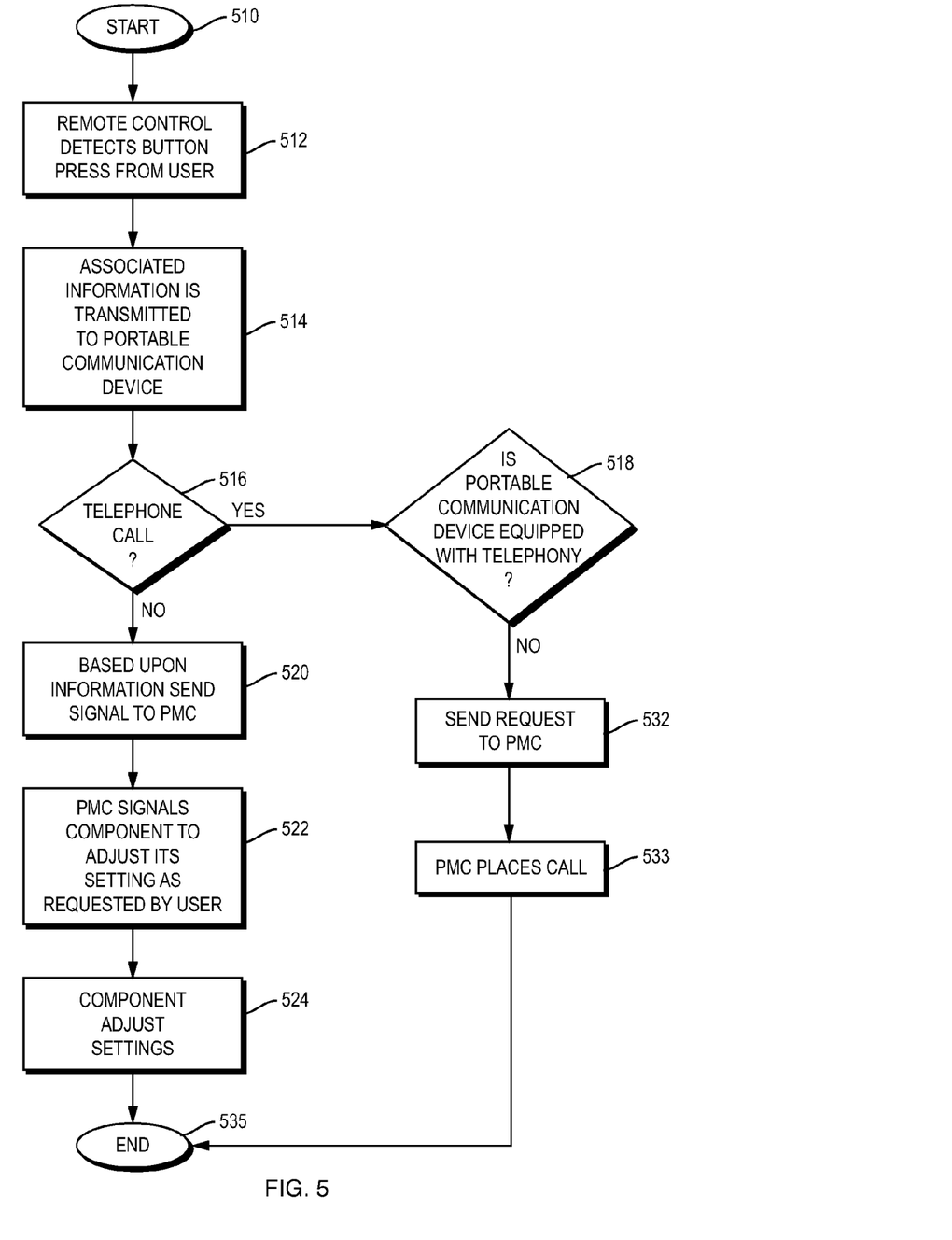
FIG. 5 is a flow chart of a procedure with respect to placing a phone call in accordance with an illustrative embodiment of the present invention.

FIG. 5 illustrates a flow chart of a procedure in accordance with the message of the present invention. The procedure starts at step 510 and continues to step 512 in which the remote control 404 (FIG. 4) detects a button press. The associated information that conforms to that button press is transmitted to the portable communication device 410 in step 514. It is determined at the portable communication device 410 whether the input request is a telephone call, in accordance with step 516. If yes, it is determined whether the portable communication device is equipped with telephony functionality, in accordance with decision step 518.

Returning to step 516, if the user is not placing a telephone call, then the portable communication sends the request message to the PMC at step 520. In response, the PMC signals the respective component to adjust settings in accordance with the incoming request as in step 522. The component then implements the new settings at step 524.

Returning to step 518, if the request is from the user to place a telephone call, then in step 518, it is determined whether the portable communication device is equipped for telephony. If it is, then the call is placed by the PMC as in step 533. If the portable communication device is not so equipped, then step 518 proceeds to the No path, and the procedure ends. Typically, however, the PMC places the call in step 533. The procedure ends at step 535.

Figure 6:
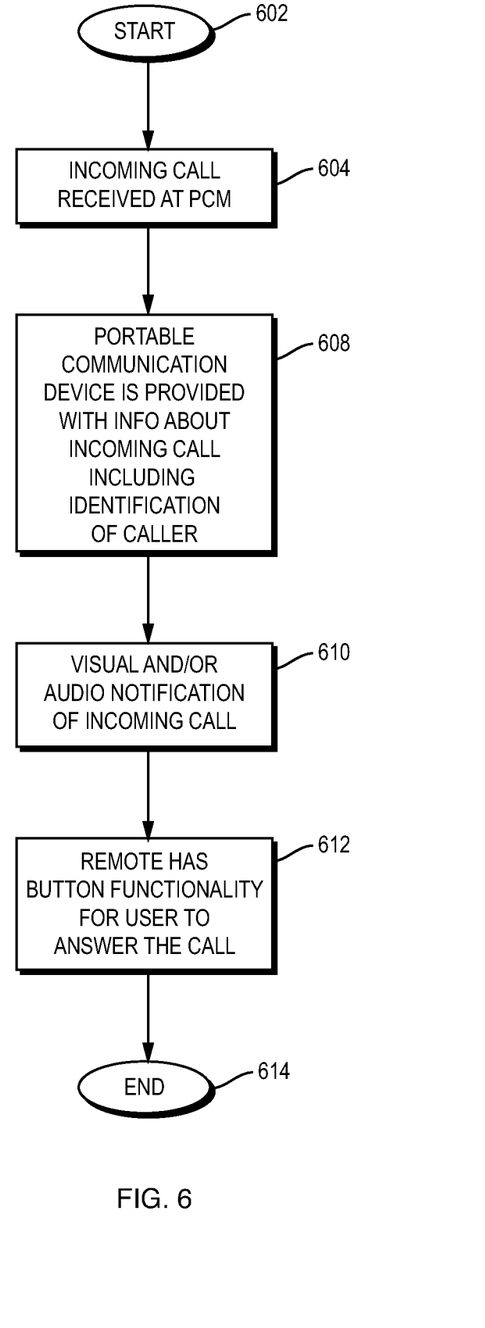
FIG. 6 is a flow chart of a procedure for receiving a call in accordance with an illustrative embodiment of the present invention.

FIG. 6 illustrates a procedure whereby an incoming call is received at the PMC. It should be understood that an incoming call might also be received at the portable communication device. In the case of the PMC, the procedure of FIG. 6 begins at step 602 and continues to step 604 in which an incoming call is received at the PMC. At step 608, the portable communication device is provided with info about an incoming call including identification of the caller. A visual and or audio notification is enabled in step 610. The remote control has an assigned "call answer" button with which the user can answer the call at step 612. The procedure ends at step 614.

It should be understood that the present invention has many advantages including providing a tool whereby the user can make selections as to the operation of a component that provides a high tactile sensation, so that the user is not required to look down at the remote. Secondly, the inventive system includes a redundant wireless communication path to a dedicated receiver, in addition to a wireless connection to the PMC. A load sharing function is provided between the portable communication device and the PMC, as they both will handle the wireless in a balanced manner.

The foregoing description has been directed to specific embodiments of this invention. It will be apparent, however, that other variations and modifications may be made to the described embodiments, with the attainment of some or all of their advantages. The procedures or processor may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A remote control device and a communication and control device (PCD) for use in a multimedia control system, comprising:
    the remote control device including
        a first section having surface enhanced buttons,
        a second section configured to receive and secure the PCD, wherein the PCD is mechanically and electrically coupled to the remote control device, and
        a transmitter and/or receiver configured to communicate with the programmable multimedia controller by way of a wireless communication path between the remote control device and a dedicated wireless device; and
    the PCD including
        an application configured to allow a user of the PCD to select and request setting changes for components coupled to a programmable multimedia controller, the components including one or more of audio, video, telephony, data, security, motor-driven or relay driven components, and
        a transmitter and/or receiver configured to communicate with the programmable multimedia controller, by way of a wireless communication path between the PCD and the programmable multimedia controller,
    wherein the remote control device is configured to, in response to a user selection received on one of the surface enhanced buttons, send a message to the programmable multimedia controller by passing the message to the PCD and requesting the PCD send the message over the wireless communication path between the PCD and the programmable multimedia controller when the PCD is available, and the remote control device is configured to send the message over the wireless communication path between the remote control device and the dedicated wireless device when the PCD is not available.

2. The remote control device and PCD of claim 1, wherein the remote control device further has a 30 pin connector that receives a respective 30 pin connector of the PCD.

3. The remote control device and PCD of claim 1 wherein the remote control device and PCD are configured to be used with the programmable multimedia controller to place a voice-over-IP (VOIP) call.

4. The remote control device and PCD of claim 1 wherein the surface enhanced buttons on the remote control device are configured as telephone dialing buttons.

5. The remote control device and PCD of claim 1, wherein the remote control device is configured to receive a state update from the programmable multimedia controller over the wireless communication path between the PCD and the programmable multimedia controller when the PCD is available, and receive the state update over the wireless communication path between the remote control device and the dedicated wireless device when the PCD is not available.

6. The remote control device and PCD of claim 1, wherein the PCD is a tablet computer.

7. The remote control device and PCD of claim 1, wherein the PCD is a portable media player.

8. The remote control device and PCD of claim 1, wherein the wireless communication path between the PCD and the programmable multimedia controller is a Wi-Fi connection.

9. A method of providing remote control in a multimedia control system, comprising:
   receiving a user selection on a remote control device that is configured to receive and secure a portable communication and control device (PCD), the PCD when so received and secured to the remote control device, to be mechanically and electrically coupled to the remote control device;
   when the PCD is available to the remote control device, sending a message reflecting the user's selection from the remote control device to a programmable multimedia controller by passing the message from the remote control device to the PCD and requesting the PCD send the message over a wireless communication path accessible to the PCD;
   when the PCD is available to the remote control device, receiving a state update at the remote control device from the programmable multimedia controller via the wireless communication path accessible to the PCD;
   when the PCD is not available to the remote control device, sending the message reflecting the user's selection over the wireless communication path accessible to the remote control device; and
   when the PCD is not available to the remote control device, receiving the state update via the wireless communication path accessible to the remote control device.

10. The method of claim 9, wherein the PCD is a tablet computer.

11. The method of claim 9, wherein the PCD is a portable media player.

* * * * *